Jan. 16, 1968 E. A. JOHNSON 3,363,558

TABULATABLE RECORDING AND DUPLICATING MASTER

Filed July 1, 1966

United States Patent Office 3,363,558

Patented Jan. 16, 1968

3,363,558

TABULATABLE RECORDING AND DUPLICATING MASTER

Everett A. Johnson, 15 S. Prospect Ave., Park Ridge, Ill. 60068

Continuation-in-part of application Ser. No. 436,595, Mar. 2, 1965. This application July 1, 1966, Ser. No. 562,187

12 Claims. (Cl. 101—473)

This application is a continuation-in-part of my copending application Ser. No. 436,595, filed Mar. 2, 1965, and now abandoned, which application is a continuation-in-part of my application Ser. No. 643,577, filed Mar. 4, 1957, and now abandoned, which application is a continuation-in-part of my application Ser. No. 336,475, filed Feb. 12, 1953, and issued as U.S. 2,783,910.

This invention relates to improvements in duplicating and multiplying records. More particularly the invention relates to a system wherein a record is made in reverse characters with a duplicating or soluble ink and reproduced therefrom as a positive image.

It has been desired to adapt tabulating machines or key sorting systems to the indexing of record cards and the reproduction of a portion of the record repeatedly but prior systems have been of limited utility for a number of reasons. Heretofore, for example, a stencil on the record card has been proposed but the messy accumulation of stencil ink on the tabulation card precludes its continued use in card indexing and tabulating machines. Furthermore, such a system also requires a separately typed means for visual identification of the card because the inked stencil is not legible.

It is, therefore, a primary object of my invention to provide a record card adapted for indexing, selecting, and tabulating from a large group of such cards and to provide means for duplicating a portion of the record. Another object of my invention is to provide a novel and improved tabulating card adapted to include means for reproducing a visual record independently of the selecting, indexing, and tabulating system. An additional object is to provide a visual record on a tabulating or sortable card adapted to be duplicated without mutilating the visual or punched records or in any way interfering with the use of the card.

A further object is to provide a method and means for conveniently interlineating, adding, or superposing characters and the like on run-off copy of another master. Another object is to provide a novel means for producing a transfer ink duplicating master. It is also an object of the invention to provide a tabulatable record embodying such novel duplicating master.

Figure 1:
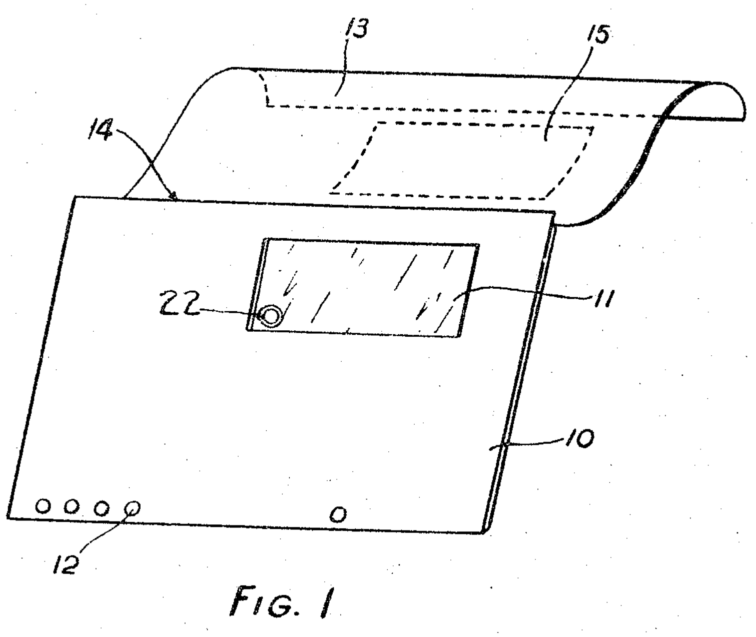
Figure 2:
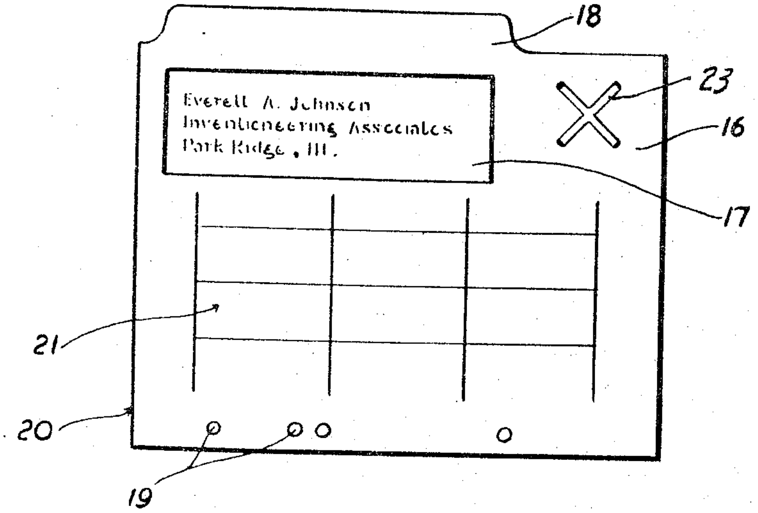

The above and other objects of my invention will become apparent from the following description taken with the accompanying drawing in which:

FIGURE 1 is a perspective view of one form of index card according to my invention; and FIGURE 2 is a plan view of another modification of the invention.

According to my invention, the tabulating index card or duplicating master includes means for recording date, indicia, customer transactions, and the like which may be recorded by typing, writing, hand or key punching, and the like. The card is preferably of stock used in card control tabulating machines. The visual identification may be set up on one side of the master or card in positive permanent ink characters and in reverse soluble ink characters on the other.

In the preferred embodiment, a transparent area is provided within which the transferable record is written in duplicating ink and reverse script, and being on a transparent area, the record is readily viewed in positive script, making other visual identification unnecessary. Also bench marks, reference lines, or the like on the base to which the record is to be transferred can be clearly viewed for orienting corresponding bench marks, etc., on the record or indicia to be transferred. These visual records and indicia provide means for identification and also provide means for reproducing the addresses or other record on base surfaces such as invoices, envelopes, labels, or the like. Thus, at any time the card is withdrawn from the file, the address can be reproduced by the liquid or spirit duplicating process from the soluble ink impression carried by the index card, either by hand or by fully automatic mechanical means.

My method of duplicating punched record data comprises forming a soluble ink master in mirror script characters on a window provided in an index or tabulatable card whereby said characters can be read as positive images when viewed through the window. A film of ink solvent is applied in a uniform coating by capillary flow on a roller to the upper or exposed face of a base sheet. The soluble characters carried by the transparent window are oriented with reference to bench marks on the master and on the base sheet and the so-oriented record is transferred by applying pressure over the window portion with the roller.

The tabulatable duplicating master or record can be provided with a key-punched record and a visual address, data, or the like which can be applied by an electrically operated typewriter which sets up the key punch simultaneously with the typing of the record. Thus, the tabulating index card contains the data, such as the customer's name and address, both key punched and typed, the typed data being in reverse or negative characters in soluble ink on the transparent area.

It is contemplated that a conventional typewriter can be modified to reverse the direction of the carriage and the script on the type heads reversed so that a duplicating ink ribbon can be used to apply the mirror script directly to the back of the window. It should be understood, however, that the invention is not limited to any particular means for producing the master record carried by the card, the inventions being directed to the transferable record.

The tabulatable duplicating master may be used with a device comprising a fluid reservoir, a wick, a roller, and means for movably mounting the roller and wick so that the roller can be wet selectively by fluid from the wick. The reservoir may be unitary with the roller mounting or detachable therefrom. When operating the device, it is placed against the workpiece comprising the surface to which the transfer is to be made. The arrangement of the elements enable the operator to pass a selectively moistened roller surface or a dry roller surface thereover. Thus, the hand duplicator involves simple hand operations after the reservoir has been filled with the duplicating ink solvent or fluid: (1) the apparatus is rolled over the clear surface with the wick in contact with the roller thereby wetting the surface of the roller which in turn transfers a film of solvent to the surface of the clear sheet; (2) the master to be duplicated (i.e., the reverse characters printed in duplicating ink on the transparent master) is placed in contact with the fluid-treated surface; and (3) the roller is drawn back over the master with the roller out of contact with the wick whereby the transfer of the ink characters to the treated surface of the sheet is effected. Inasmuch as the duplicating fluid evaporates quickly from the roller, it is dry by the time it is passed back over the master.

Apparatus of such design and proportions as to be employed with my tabulating duplicator master are, for example, those of my U.S. Patents 2,563,842, 2,570,243, 2,572,034; and Des. Patent 163,951.

Suitable fluids are spirit-type ink solvents, low-boiling solvents generally adapted to penetrate paper and the like, and fluids such as methanol-acetone mixtures, light naphtha, chlorofluoromethanes and ethanes, such as trichloromonofluoromethane, and similar volatile fluids which are solvents for duplicating inks.

Referring to the drawing, FIGURE 1 illustrates a form of index card which comprises a blank 10 having a window 11 glazed with a durable transparent material which is impermeable to the transfer fluid and resistant to cutting by type. The illustrated embodiment also includes key punches or perforations 12 for sorting, but long hand or type records are also entered upon the blank 10.

Referring to the window 11, soluble ink characters are placed on the remote or rear surface so that characters are positive when viewed through the window. One way to apply the mirror script and soluble characters is by means of a duplicating ink component. This may be carried by a flexible or tissue sheet such as flap 13 shown attached to the blank 10 along the edge 14. The flap 13 is removable and the patch 15 may comprise an area of latent transfer ink, the area being coextensive with the window 11. Such ink component may be held within pressure-rupturable capsules or pellets of gelazin, agar-agar, or the like. Hence, when the address or other record is imprinted over the window with patch 15 in place behind it, the corresponding mirror script characters are applied to the underside of the window 11 and a transparent master produced which can be viewed in positive script through the window.

The patch 15 may comprise a coating of pressure-rupturable micropellets as described and the window 11 coated with activated clay which combines with the latent ink of patch 15 to discolor the clay and provide a transferable image. The latent ink in the pressure-rupturable microscopic capsules is a colorless color-reactant which turns to a colored form on contact with the window 11 or 17 which is sensitized by having thereon an acid clay-like material, such as attapulgite. The color reactant may be of the phthalide type such as crystal violet lactone, and an oxidizing colorless compound such as benzoyl leucomethylene blue which oxidizes on the clay materials to form a color. The preferred capsule material is gelatin or a complex of gelatin and gum arabic, although other gellabale hydrophilic colloids may be used.

The patch 15 may comprise a coating of pressure-rupturable micropellets of hectograph ink which is released to the window 11 but is dry or smudge-proof until ruptured as for instance in the typing of the record.

It is also contemplated that the window 11 and 17 may comprise the latent ink supply with the patch 15 being the clay treated or sensitized surface which causes the ruptured capsules to discolor and provide a transferable ink source.

Bench marks 22 may be applied to windows 11 and 17 and are placed in register with mating bench marks on the base sheet to orient the transferred record with indicia or the like on the base sheet normally covered by the opaque portion of the tabulatable duplicating master blank 10. Bench mark 23 comprising an identifiable symbol or out-out in the opaque portion of the tabulatable card 10 and 16 is provided and is used to visually identify the card and also to guide the orientation of the master over the base sheet.

FIGURE 2 illustrates another embodiment of my invention wherein the card 16 having window 17 is provided with a tab 18, punch record 19, space for visually recording transactions at 21, and bench mark 23. It is contemplated that the surface of the window 17 to receive the soluble ink impressions is provided with a latent ink surface in the form of pressure-rupturable micropellets or capsules which are broken to release the transfer ink or ink component. In such a system, the capsule is not soluble in the spirit duplicating fluid but the contents of the capsule is. Also when using such latent ink, the paper base sheet can be sensitized with the reactive clay which discolors when contacted with the contents of the ruptured capsules or microballoons. In any event, the latent ink surface provides a clean card, free of any transferable ink, and retains the advantages of a tabulatable record.

The transparent master and the system for applying the record to the master by means of the rupturable capsules and the clay treated surfaces may be used independently of the tabulating card support.

The transparent area or window may comprise an insert of cellophane, polyethylene, or other transparent material resistant to ink solvents. Preferably it is tough and resistant to cutting by typewriter type and remains fluid-impermeable in use. Alternatively, the blank 10 and the window 11 or 17 comprises a processed portion of the blank to render it translucent of transparent.

It is also contemplated that the window surface may be coated with an insoluble material which takes the duplicating ink characters more readily than some glossy materials. A suitable material for coating is a gelatin conventionally employed in connection with duplicating systems of this general character. Also, an adhesive coating rendered selectively tacky to cause transfer ink source to adhere in the pattern of the image may be used.

Other compositions of window materials may be of the heat-printing type paper with heat-rupturable latent ink capsules on the active surface of the window. Thus an original positive script (such as typed, stenciled, electrocopied) is placed behind the window and the two positioned under an infra-red source. The ink source capsules rupture in a manner to produce a hectograph master corresponding to the original indicia but in reverse script. The indicia are also created in the thermal copy paper in positive script.

Another embodiment contemplates a latent tacky surface on the rear window area which when exposed to infrared radiation over an original produces tacky areas in reverse script; these areas are placed in contact with microcapsules on a storage sheet, the tacky indicia stripping capsules from the storage sheet to form a dry reverse image master which is energized or activated when employed in the spirit duplicating process by releasing transfer ink from the mounted microcapsules.

An electrostatically imaged copy may be obtained by the Xerox process, for example as described in U.S. Patents 2,357,809 and 2,297,691. Such system may be used to provide a hectograph master by affixing microcapsules, as by dusting, onto the electrostatically imaged copy when the latently adhesive material has been rendered tacky by infrared radiation.

Another use for my invention is in conjunction with an educational or amusement device. More specifically, mirror script images or characters may be applied in duplicating ink to a master, the color of the master matching the color of the ink. Then upon reproducing the unknown character by the spirit duplicating process described herein will the operator discover the nature of the image or character.

The invention includes a duplicating master index card for use in information retrieval systems and for transferring unique record information which comprises a generally rectangular card of opaque stock with identifying means on said card for automatic sorting. A window area in the card comprises only a minor portion of the total area of said card and this window area comprises a transparent, fluid-impervious portion. The transparent portion has affinity for hectographic transfer ink and an expandable indicia source overlies the rear face of the card and is at least partially in register with the window area. To produce visually readable indicia on the window area the transparent window area and the expendable source are brought into juxtaposition.

The expendable indicia source may comprise a multitude of microcells which release indicia-producing material which is applied to the transparent portion when indicia are produced on the window area. Thus the micro-cells can be ruptured by pressure or heat or electrostatic tension.

In another embodiment the rear face of the window area includes a reactive clay and the expendable indicia source comprises thermally rupturable microcapsules which selectively release indicia-producing material for reaction with the clay.

The invention also contemplates an indicia recording and reproducing assembly for use with information retrieval systems which includes the mechanically sortable card with its continuous, fluid-impervious window area in said card and wherein the window area is sensitive to indicia recording; the window area has thereon indicia produced by one system selected from the group of hectographic, electrostatic and thermal copying systems, each of the indicia being adapted to be subsequently reproduced by another of the copying systems. Thus, the recorded indicia can be produced by the thermal copying system to produce a transfer ink master reproducible by the spirit duplicating system.

For example, the duplicating master may comprise thermally produced indicia viewable in positive script on one surface and have in register therewith corresponding hectographic ink indicia in reverse script on the other surface. More specifically, I provide a transparent duplicating master comprising electrostatically produced indicia viewable in positive script on one surface and having in register therewith corresponding hectographic ink indicia in reverse script on the other.

In yet another embodiment the duplicating master index card has a transparent portion which is itself thermally sensitive and the indicia thereon include thermal facsimiles of transfer ink indicia in mirror script formed thereon.

From the above description, it is apparent that I have attained the objects of my invention and have provided a novel master copy sheet which is tabulatable and a novel method of keeping and reproducing records. It should be understood, however, that modifications may be made in the illustrated and described embodiments by those skilled in the art without departing from the spirit and scope of my invention.

What I claim is:

1. A hectograph master index card for use in punched card systems and for transferring ink records by the spirit duplicating process to a base sheet which comprises a generally rectangular card of heavy opaque stock, a cut-out window area in said card comprising only a minor portion of the total area of said card, a transparent fluid-impervious sheet fixed to the said card and across said window area said transparent sheet having affinity for hectograph transfer ink, an expendable flexible sheet overlying the rear surface of said card and in register with at least said window area, said expendable sheet being removably fixed to said card and being of different stock than said card, and a hectograph transfer ink source on said sheet with its active surface in register with said window area.

2. The master card of claim 1 wherein said transparent sheet across said window area consists essentially of cellophane stock coated on its rear surface with a transparent gelatin having affinity for the transfer ink source on said expendable flexible sheet.

3. The index card of claim 1 wherein said ink source comprises a multitude of micro-cells containing transfer ink, said cells being rupturable when indicia are applied to said window.

4. The duplicating master and index card of claim 1 comprising a latent ink source on said window, said source comprising a multitude of micro-cells containing a transfer ink component and said cells being ruptured when indicia are formed on said window to produce visual indicia thereon.

5. The index card of claim 3 wherein said cells are rupturable by pressure applied when indicia are formed on said window.

6. The index card of claim 1 including a bench mark on said transparent sheet for register with a bench mark on a base sheet.

7. The card of claim 1 which is provided with a bench mark for orienting the window on a base surface normally concealed by said blank when disposed thereover.

8. A hectograph master index card for use in punched card systems and for transferring ink records by the spirit duplicating process which comprises a generally rectangular card of heavy opaque stock, a window area in said card adjacent the top edge thereof, said window area comprising only a minor portion of the total area of said card, a transparent fluid-impervious sheet fixed to the rear face of said card and across said window area, a removable flexible sheet overlying the rear face of said card and coextensive at least with the exposed rear surface of transparent sheet, said removable sheet being fixed along one margin to said card and being of different stock than said card, and a supply of hectograph transfer ink on said removable sheet with its active surface in register with said window area.

9. The master index card of claim 8 including an upstanding tab along the top edge and wherein said removable sheet consists essentially of a thin expendable stock substantially coextensive with said card.

10. The master card of claim 8 wherein said transparent sheet consists essentially of cellophane stock coated on its rear surface with a transparent gelatin having affinity for the transfer ink on said removable flexible sheet.

11. A duplicating master index card for use in information retrieval systems and for transferring unique record information which comprises a generally rectangular card of opaque stock having a front face and a rear face, identifying means on said card for mechanical sorting thereof, a window area in said card comprising only a minor portion of the total area of said card, said window area comprising a transparent, fluid-impervious portion, said transparent portion having affinity for hectograph transfer ink, an expendable indicia source including hectograph transfer ink overlying the rear face of said card and at least partially in register with said window area, said expendable source being removably fixed to said card and being of different stock than said card, whereby said transparent window area and said expendable source are adapted to be brought into direct contact to produce visually readable indicia on said window area which are viewable from said front face.

12. The duplicating master index card of claim 11 wherein said expendable indicia source comprises a multitude of microcells which release indicia-producing material which is applied to said transparent portion to produce indicia on said window area.

References Cited

UNITED STATES PATENTS

| | | | |
|---|---|---|---|
| 2,297,691 | 10/1942 | Carlson | 101—149.4 X |
| 2,428,945 | 10/1947 | Singer. | |
| 2,548,366 | 4/1951 | Green et al. | 101—426 |
| 2,919,640 | 1/1960 | Ritzerfeld et al. | |
| 2,970,534 | 2/1961 | Marron | 101—149.4 |
| 3,122,998 | 3/1964 | Raczynski et al. | 101—149.4 X |
| 3,148,617 | 9/1964 | Roshkind | 101—149.4 |

DAVID KLEIN, *Primary Examiner.*